(12) United States Patent
Laskaris et al.

(10) Patent No.: US 6,412,289 B1
(45) Date of Patent: Jul. 2, 2002

(54) SYNCHRONOUS MACHINE HAVING CRYOGENIC GAS TRANSFER COUPLING TO ROTOR WITH SUPER-CONDUCTING COILS

(75) Inventors: Evangelos Trifon Laskaris, Schenectady; James Pellegrino Alexander, Ballston Lake; Robert Adolph Ackermann, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/854,931

(22) Filed: May 15, 2001

(51) Int. Cl.[7] .................. F17C 13/00; F01D 11/02; F16J 15/44; H02K 1/32; H02K 9/06
(52) U.S. Cl. ..................... 62/50.7; 277/347; 310/61
(58) Field of Search .................. 62/50.7; 277/347; 310/61

(56) References Cited

U.S. PATENT DOCUMENTS

| | | | | |
|---|---|---|---|---|
| 3,991,587 A | * | 11/1976 | Laskaris | 62/50.7 |
| 3,991,588 A | * | 11/1976 | Laskaris | 62/50.7 |
| 4,018,059 A | * | 4/1977 | Hatch | 62/50.7 |
| 4,101,793 A | * | 7/1978 | Berthet et al. | 310/52 |
| 4,164,126 A | * | 8/1979 | Laskaris et al. | 62/50.7 |
| 4,207,745 A | * | 6/1980 | Pouillange | 62/50.7 |
| 4,289,985 A | * | 9/1981 | Popov et al. | 310/61 |
| 4,329,849 A | * | 5/1982 | Hofmann et al. | 62/50.7 |
| 4,488,406 A | * | 12/1984 | Eckels | 62/50.7 |

* cited by examiner

Primary Examiner—William C. Doerrler
(74) Attorney, Agent, or Firm—Nixon & Vanderhye P.C.

(57) ABSTRACT

A cooling fluid coupling is disclosed for providing cooling fluid to a rotor having a super-conducting winding of a synchronous machine and a source of cryogenic cooling fluid. The fluid coupling comprises an inlet cooling tube and an outlet cooling tube in the rotor and coaxial with an axis of the rotor. The inlet cooling tube has an input port coupled to receive inlet cooling fluid from the source of cryogenic cooling fluid. The outlet cooling tube has an output port coupled to return cooling fluid from the rotor to source. A stationary motion gap seal separates the input port and output port of the coupling.

18 Claims, 6 Drawing Sheets

SYNCHRONOUS MACHINE HAVING CRYOGENIC GAS TRANSFER COUPLING TO ROTOR WITH SUPER-CONDUCTING COILS

RELATED APPLICATIONS

This application is related to the following commonly-owned and commonly-filed applications (the specifications and drawings of each are incorporated herein):

U.S. patent application Ser. No. 09/854,932 entitled "Superconducting Synchronous Machine Having Rotor And A Plurality Of Super-Conducting Field Coil Windings", filed May 15, 2001;

U.S. patent application Ser. No. 09/854,933 entitled "High Temperature Super-Conducting Rotor Coil Support With Split Coil Housing And Assembly Method", filed May 15, 2001;

U.S. patent application Ser. No. 09/855,026 entitled "High Temperature Super-Conducting Synchronous Rotor Coil Support With Tension Rods And Method For Assembly Of Coil Support", filed May 15, 2001;

U.S. patent application Ser. No. 09/854,946 entitled "High Temperature Super-Conducting Rotor Coil Support With Tension Rods And Bolts And Assembly Method", filed May 15, 2001;

U.S. patent application Ser. No. 09/854,939 entitled "High Temperature Super-Conducting Coils Supported By An Iron Core Rotor", filed May 15, 2001;

U.S. patent application Ser. No. 09/854,938 entitled "High Temperature Super-Conducting Synchronous Rotor Having An Electromagnetic Shield And Method For Assembly", filed May 15, 2001;

U.S. patent application Ser. No. 09/854,940 entitled "High Temperature Super-Conducting Rotor Coil Support And Coil Support Method", filed May 15, 2001;

U.S. patent application Ser. No. 09/854,937 entitled "High Temperature Super-Conducting Rotor Having A Vacuum Vessel And Electromagnetic Shield And Method For Assembly", filed May 15, 2001;

U.S. patent application Ser. No. 09/854,944 entitled "A High Power Density Super-Conducting Electric Machine", filed May 15, 2001;

U.S. patent application Ser. No. 09/854,943 entitled "Cryogenic Cooling System For Rotor Having A High Temperature Super-Conducting Field Winding", filed May 15, 2001;

U.S. patent application Ser. No. 09/854,464 entitled "High Temperature Super-Conducting Racetrack Coil", filed May 15, 2001; and U.S. patent application Ser. No. 09/855,034 entitled "High Temperature Super Conducting Rotor Power Leads", filed May 15, 2001.

BACKGROUND OF THE INVENTION

The present invention relates generally to a super-conducting coil in a synchronous rotating machine. More particularly, the present invention relates to a cryogenic gas coupling between a source of cryogenic fluid and the rotor of the machine.

Synchronous electrical machines having field coil windings include, but are not limited to, rotary generators, rotary motors, and linear motors. These machines generally comprise a stator and rotor that are electromagnetically coupled. The rotor may include a multi-pole rotor core and coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate at an air-gap magnetic field strength of about 2 Tesla. Known super-conductive rotors employ air-core designs, with no iron in the rotor, to achieve air-gap magnetic fields of 3 Tesla or higher, which increase the power density of the electrical machine and result in significant reduction in weight and size. Air-core super-conductive rotors, however require large amounts of super-conducting wire, which adds to the number of coils required, the complexity of the coil supports, and the cost.

High temperature SC coil field windings are formed of super-conducting materials that are brittle, and must be cooled to a temperature at or below a critical temperature, e.g., 27° K, to achieve and maintain super-conductivity. The SC windings may be formed of a high temperature super-conducting material, such as a BSCCO ($Bi_xSr_xCa_xCu_xO_x$) based conductor.

Super-conducting coils have been cooled by liquid helium. After passing through the coil windings of the rotor, the hot helium is returned from the windings as room-temperature gaseous helium. Using liquid helium for cryogenic cooling requires continuous reliquefaction of the returned, room-temperature gaseous helium. This reliquefaction poses significant reliability problems and requires significant auxiliary power for cryorefrigeration.

Prior cooling techniques include cooling an epoxy-impregnated SC coil through a solid conduction path from a cryocooler. Alternatively, cooling tubes in the rotor may convey a liquid and/or gaseous cryogen to a porous SC coil winding that is immersed in the flow of the liquid and/or gaseous cryogen. Immersion cooling requires the entire field winding and rotor structure to be at cryogenic temperature, as a result no iron can be used in the rotor magnetic circuit because of the brittle nature of iron at cryogenic temperatures.

A cooling fluid coupling is needed to connect the stationary cryorefrigeration unit to the rotor and its SC coils. The coupling must transfer inlet and outlet cooling fluid between a stationary source and the rotating end shaft of a rotor. Contact seals are commonly used in transfer couplings for cryogenic cooling systems connected to rotors and other rotating components. Contact seals have increased frictional losses that degrade cryorefrigerator capacity, and limit the life and reliability of the coupling because of seal wear. Relative motion gap seals have also been used in transferring cooling fluid to a rotor. However, relative motion gap seals have high heat transfer losses. Extended thermal standoff lengths for the relative motion gaps have been used to reduce heat transfer losses to the cryogenic gas and to improve cryorefrigerator capacity. However, these long thermal standoff lengths result in long overhung tubes that may vibrate excessively and come into rubbing contact with the rotor of the generator. Accordingly, there is a long-felt need for better cryogenic gas couplings with a rotor.

Heat transfer losses with respect to the cryogenic gas cooling system for the HTS coils should preferably be minimized to conserve refrigeration power. The coupling between the stationary cryogenic gas source and the rotor of the synchronous machine is a potential source of cryogenic gas leakage. To minimize gas leakage at the coupling, it is desirable that the leakage between the inlet and return gas streams be minimized, and that adequate thermal insulation be provided between the cryogenic gas and surrounding ambient temperature components. In addition, the operational life and high reliability of the transfer coupling should be commensurate to the expected life and reliability of the synchronous electrical machine.

BRIEF SUMMARY OF THE INVENTION

A cooling gas coupling has been developed to connect a supply of cryogenic gas (or cooling fluid) to the shaft of a rotor in a synchronous electrical machine. Cooled cryogenic gas (or other fluid) is transferred from a stationary cryorefrigerator through a stationary bayonet to a tube rotating with the rotor having a HTS coil winding. The cooling gas transfer occurs using a cryogenic gas transfer joint attached to the collector end of the rotor. A relative motion gap created with a clearance seal about a bayonet coupling limits leakage of the inlet cooling gas to the lower pressure return gas, and a relative motion gap over a length of the rotating return tube provides thermal insulation to the return cryogenic gas.

In a first embodiment, the invention is a cooling fluid coupling for providing cooling fluid to a rotor having a super-conducting winding of a synchronous machine and a source of cryogenic cooling fluid. The fluid coupling comprises an inlet cooling tube and an outlet cooling tube in the rotor and coaxial with an axis of the rotor. The inlet cooling tube has an input port coupled to receive inlet-cooling fluid from the source of cryogenic cooling fluid. The outlet cooling tube has an output port coupled to return cooling fluid from the rotor to source. A rotating motion gap seal separates the input port and output port of the coupling.

In another embodiment, the invention is a cooling fluid coupling between a rotor for a synchronous machine and a source of cryogenic cooling fluid. The coupling comprises: (i) a rotating inlet cooling tube and a rotating outlet cooling tube in the rotor and coaxial with an axis of the rotor; (ii) the inlet cooling tube is coupled to receive inlet cooling fluid from the source of cryogenic cooling fluid; (iii) the outlet cooling tube is coupled to return cooling fluid from the rotor to source, and (iv) a rotating motion gap seal supports the inlet cooling tube in the outlet cooling tube.

In a further embodiment, the invention is a cooling fluid coupling between a rotor for a synchronous machine and a source of cryogenic cooling fluid. This coupling comprises: (i) a rotating inlet cooling tube and a rotating outlet cooling tube in the rotor and coaxial with an axis of the rotor; (ii) the inlet cooling tube is coupled to receive inlet cooling fluid from the source of cryogenic cooling fluid; (iii) the outlet cooling tube is coupled to return cooling fluid from the rotor to source; (iv) a rotating non-contact motion gap seal supporting the inlet cooling tube in the outlet cooling tube; (v) a stationary third tube encircling the outlet cooling tube and said third tube supported by a bearing, and (vi) a magnetic field seal supporting the outlet cooling tube in the stationary third tube.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
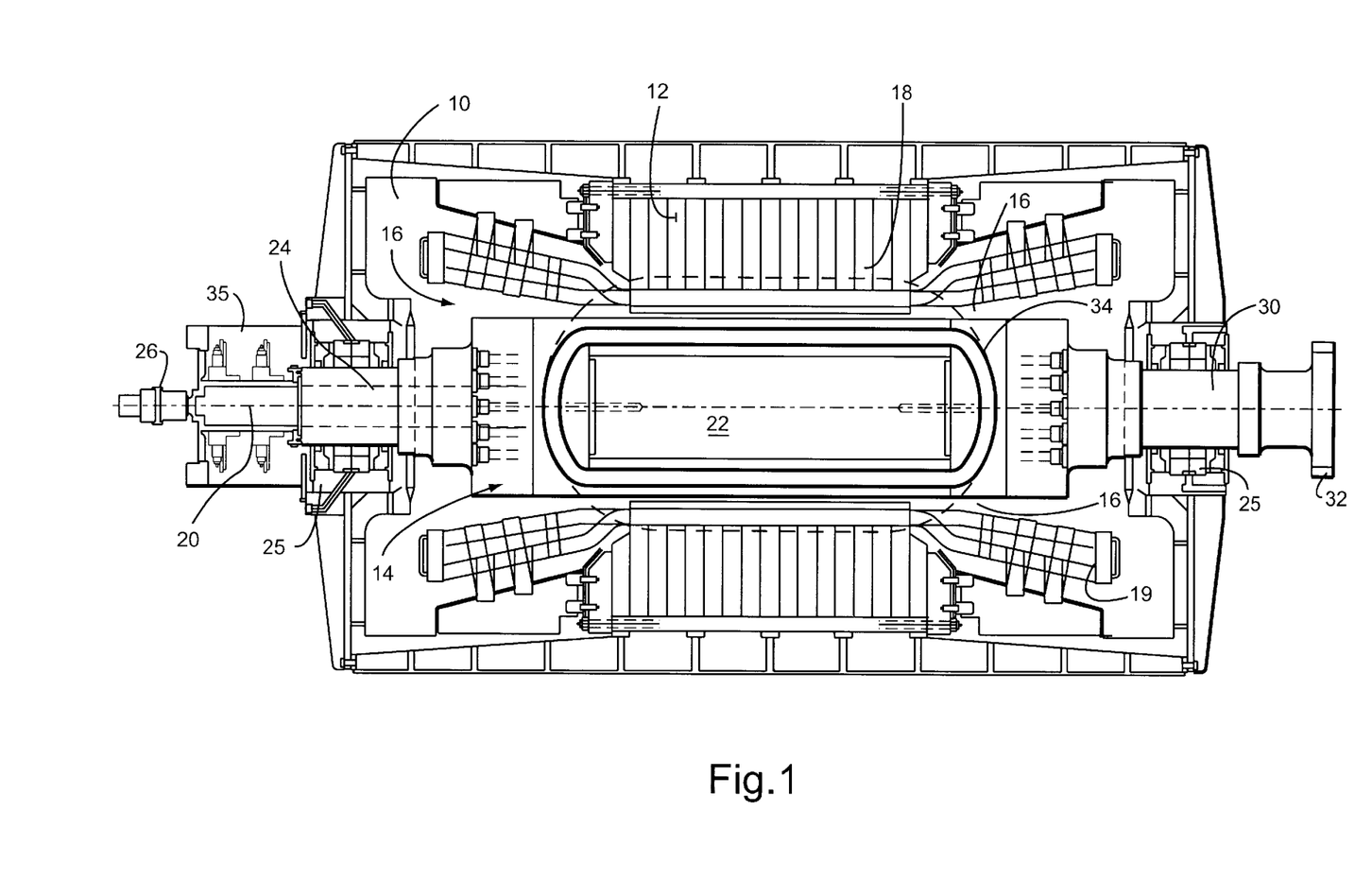
FIG. 1 is a schematic side elevational view of a synchronous electrical machine having a super-conductive rotor and a stator.

FIG. 1 shows an exemplary synchronous generator machine 10 having a stator 12 and a rotor 14. The rotor includes field winding coils 34 that fit inside a cylindrical vacuum cavity 16 of the stator. The rotor fits inside the vacuum cylindrical cavity of the stator. As the rotor turns within the stator, a magnetic field 18 (shown by dotted lines) generated by the rotor and rotor coils moves through the stator and creates an electrical current in the windings of the stator coils 19. This current is output by the generator as electrical power.

The rotor 14 has a generally longitudinally-extending axis 20 and a generally solid rotor core 22. The solid core 22 has high magnetic permeability and is usually made of a ferromagnetic material, such as iron. In a low power density super-conducting machine, the iron core of the rotor is used to reduce the magnetomotive force (MMF), and, thus, minimize the coil winding usage. For example, the iron of the rotor can be magnetically saturated at an air-gap magnetic field strength of about 2 Tesla.

The rotor 14 supports a generally a longitudinally-extending, racetrack-shaped high temperature super-conducting (HTS) coil winding 34. HTS coil winding may be alternatively a saddle-shape coil or have some other coil winding shape that is suitable for a particular HTS rotor design. The cooling coupling disclosed here may be adapted for coil winding and rotor configurations other than a racetrack coil mounted on a solid core rotor.

The rotor includes a pair of end shafts 24, 30 that bracket the core 22 and are supported by bearings 25. The collector end shaft 24 includes a collector rings 35 for electrically connecting to the rotating SC coil winding. The collector end shaft has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The drive end shaft 30 may be driven by a power turbine via drive coupling 32.

Figure 2:
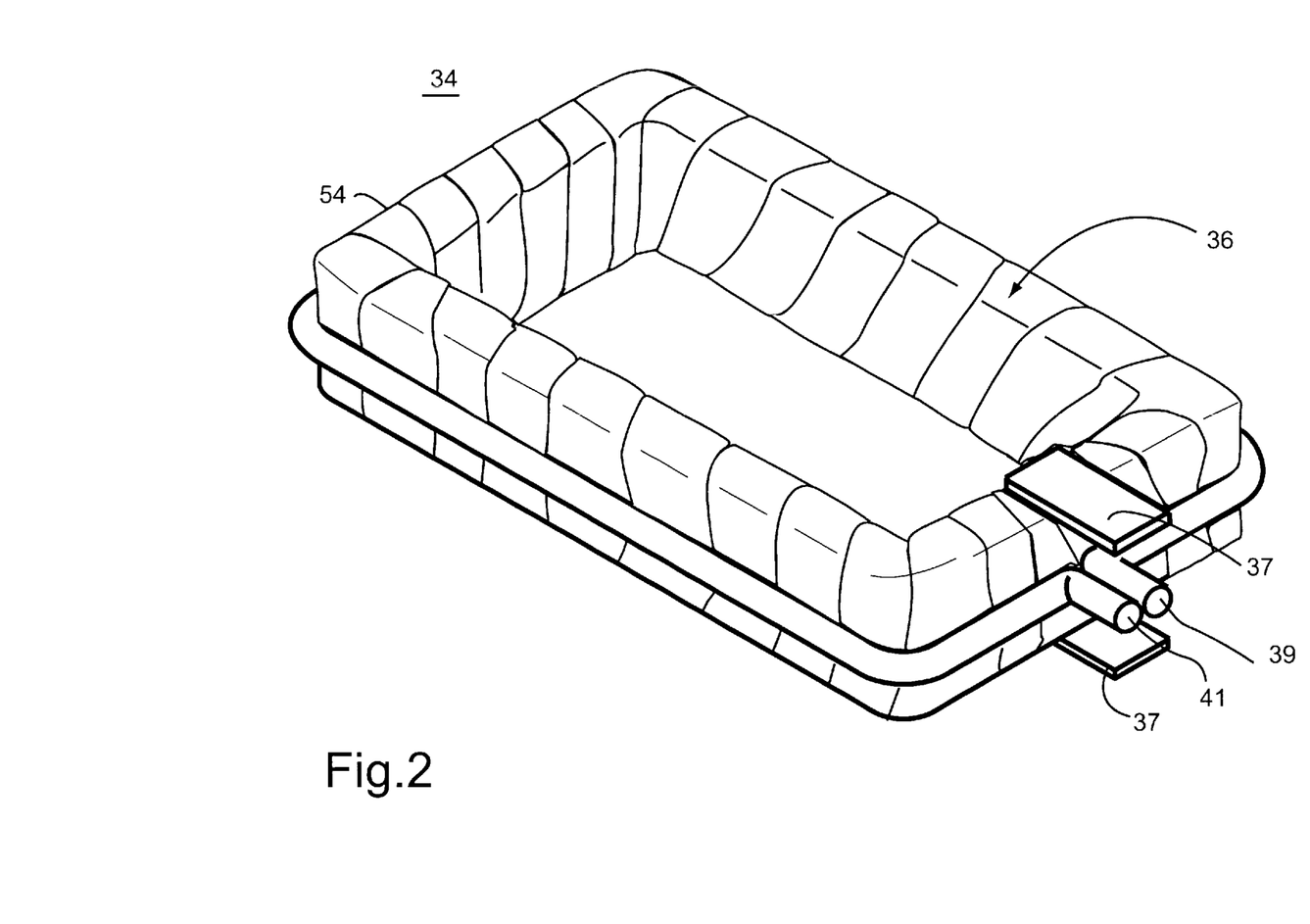
FIG. 2 is a schematic diagram of a racetrack SC coil having cooling gas passages.

FIG. 2 shows an exemplary HTS racetrack SC field winding 34. The SC field winding 34 of the rotor includes a high temperature super-conducting coil 36. Each HTS coil includes a high temperature super-conducting conductor, such as a BSCCO ($Bi_xSr_xCa_xCu_xO_x$) conductor wires laminated in a solid epoxy impregnated winding composite tape. For example, a series of BSCCO 2223 wires may be laminated, bonded together and wound into a solid epoxy impregnated coil.

The SC coil is typically layer wound SC tape that is epoxy impregnated. The SC tape is wrapped in a precision coil form to attain close dimensional tolerances. The tape is wound around in a helix to form the racetrack SC coil 36.

The dimensions of the racetrack coil are dependent on the dimensions of the rotor core. Generally, each racetrack SC coil encircles the magnetic poles of the rotor core, and is parallel to the rotor axis. The coil windings are continuous around the racetrack. The SC coils form a resistance free electrical current path around the rotor core and between the magnetic poles of the core. The coil has electrical contacts 37 that electrically connect the coil to the collector 35.

Fluid passages 38 for cryogenic cooling fluid are included in the coil winding 34. These passages may extend around an outside edge of the SC coil 36. The passageways provide cryogenic cooling fluid to the coil and remove heat from the coil. The cooling fluid, e.g., helium, maintains the low temperatures, e.g., 27° K, in the SC coil winding needed to promote super-conductive conditions, including the absence of electrical resistance in the coil. The cooling passages have an input port 39 and an output port 41 at one end of the rotor core. These ports connect to the cooling passages 38 on the SC coil and to the cryogen transfer coupling 26 at an opposite end of the end shaft 24.

Figure 3:
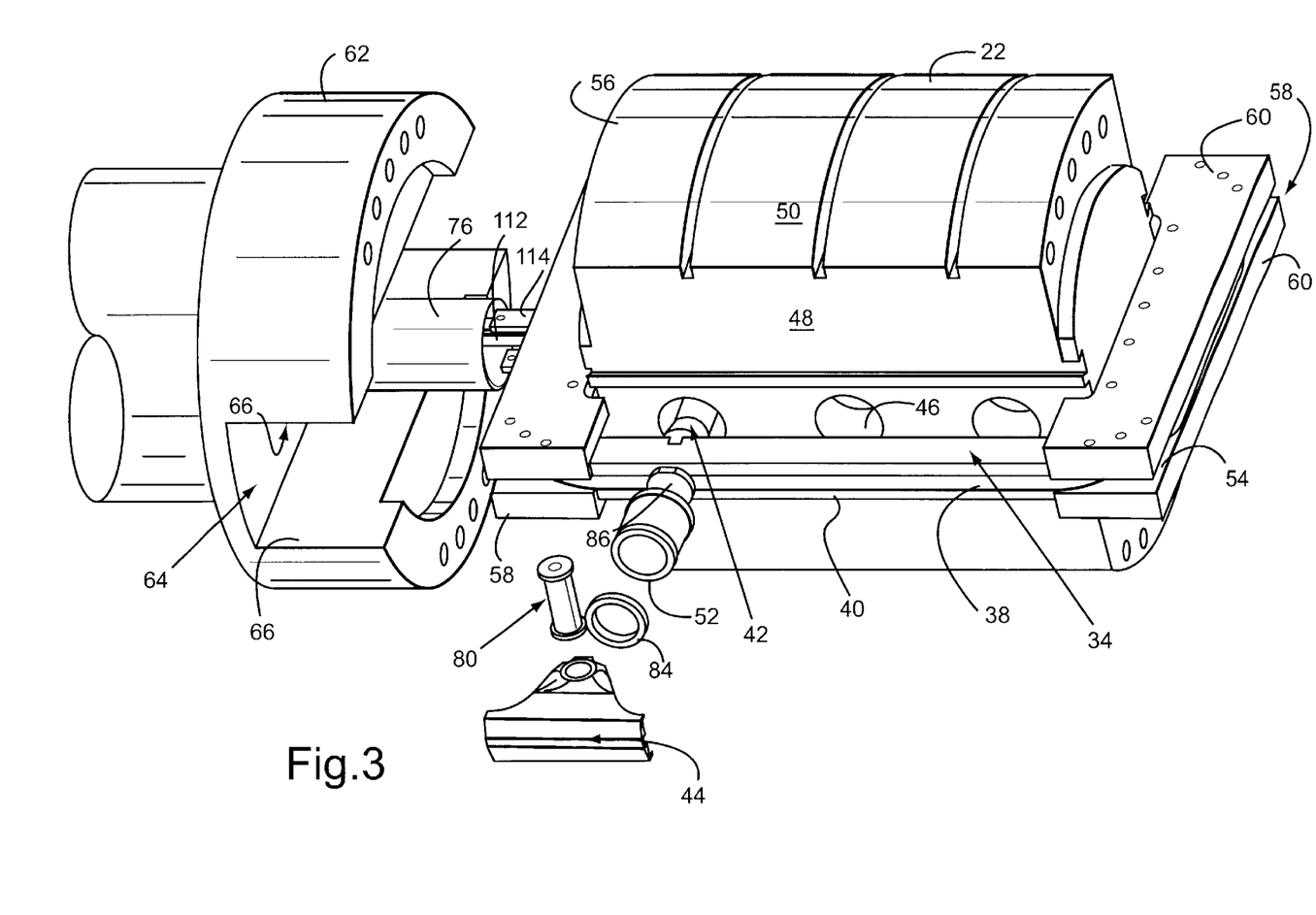
FIG. 3 is a schematic diagram with a partially cut-away view of a rotor having a racetrack SC coil winding.

FIG. 3 shows an exploded view of a rotor core 22 and coil support system for a high temperature super-conducting coil. The support system includes tension rods 42 connected to a coil housing 44. The housings hold and support the side portions 40 of the coil winding 34 in the rotor. While one tension rod and channel housing is shown, the coil support system will generally include a series of tension rods that each have coil support housings at both ends of the rod. The tension rods and channel housings prevent damage to the coil winding during rotor operation, support the coil winding with respect to centrifugal and other forces, and provide a protective shield for the coil winding.

The HTS coil winding and structural support components are at cryogenic temperature. In contrast, the rotor core is at ambient "hot" temperature. The coil supports are potential sources of thermal conduction that would allow heat to reach the HTS coils from the rotor core. The rotor becomes hot during operation. As the coils are to be held in super-cooled conditions, heat conduction into the coils is to be avoided. The rods extend through conduits 46 in the rotor but are not in contact with the rotor. This lack of contact reduces the conduction of heat from the rotor to the tension rods and coils.

To reduce the heat transfer to the coil, the coil support is minimized to reduce the thermal conduction through support from heat sources such as the rotor core. There are generally two categories of support for super-conducting winding: (i) "warm" supports and (ii) "cold" supports. In a warm support, the supporting structures are thermally isolated from the cooled SC windings. With warm supports, most of the mechanical load of a super-conducting (SC) coil is supported by structural members spanning from cold to warm members.

In a cold support system, the support system is at or near the cold cryogenic temperature of the SC coils. In cold supports, most of the mechanical load of a SC coil is supported by structural members which are at or near a cryogenic temperature. The exemplary coil support system disclosed here is a cold support in that the tension rods and associated housings that couple the tension rods to the SC coil windings are maintained at or near a cryogenic temperature. Because the supporting members are cold, these members are thermally isolated, e.g., by the non-contact conduits through the rotor core, from other "hot" components of the rotor. Insulating tubes 52 separate the tension rods 42 from the conduit walls in the rotor core. These tubes are inserted into the ends of each conduit 42. The tension rods extend through the center of the tube. The insulating tubes 52 center the tension rods in the conduits and prevent heat from the hot rotor core from transferring to the cold tension rods.

An individual support member consists of a tension rod 42 (which may be a bar and a pair of bolts at either end of the bar), a channel housing 44, and a dowel pin 80 that connects the housing to the end of the tension rod. Each channel housing 44 is a U-shaped bracket having legs that connect to a tension rod and a channel to receive the coil winding 34. The U-shaped channel housing allows for the precise and convenient assembly of the support system for the coil. A series of channel housings may be positioned end-to-end along the side of the coil winding. The channel housings collectively distribute the forces that act on the coil, e.g., centrifugal forces, over substantially the entire side sections 40 of each coil.

The dowel pin 80 extends through apertures in the channel housing and tension rod. The dowel may be hollow for low weight. Locking nuts 84 are threaded or attached at the ends of the dowel pin to secure the housing 44 and prevent the sides of the housing from spreading apart under load. The dowel pin can be made of high strength Inconel or titanium alloys. The tension rods are made with larger diameter ends 82 that are machined with two flats 86 at their ends to fit the coil housing and coil width. The flat ends 86 of the tension rods abut the inside surface of the HTS coils, when the rod, coil and housing are assembled together. This coil support assembly reduces the stress concentration at the hole in the tension rod that receives the dowel.

The rotor core 22 is typically made of magnetic material such as iron, while the rotor end shafts are typically made of non-magnetic material such as stainless steel. The end shafts 24, 30 may be formed of stainless steel. The rotor core and end shafts are typically discrete components that are assembled and securely joined together by either bolting or welding.

The iron rotor core 22 has a generally cylindrical shape suitable for rotation within the rotor cavity 16 of the stator 12. To receive the coil winding 34, the rotor core has recessed surfaces 48, such as flat or triangular regions or slots. These surfaces 48 are formed in the curved surface of the cylindrical core and extending longitudinally across the rotor core. The coil winding 34 is mounted on the rotor adjacent the recessed areas 48. The coils generally extend longitudinally along an outer surface of the recessed area and around the ends of the rotor core. The recessed surfaces 48 of the rotor core receive the coil winding. The shape of the recessed area conforms to the coil winding. For example, if the coil winding has a saddle-shape or some other shape, the recess(es) in the rotor core would be configured to receive the shape of the winding.

The end sections 54 of the coil winding 34 are adjacent opposite ends 56 of the rotor core. A split-clamp 58 holds each of the end sections of the coil windings in the rotor. The split clamp at each coil end 54 includes a pair of opposite plates 60 between which is sandwiched the coil winding 34. The surface of the clamp plates includes channels to receive the coil winding and connections 112, 114 to the winding.

The split clamp 58 may be formed of a non-magnetic material, such as aluminum or Inconel alloys. The same or similar non-magnetic materials may be used to form the tension rods, channel housings and other portions of the coil support system. The coil support system is preferably nonmagnetic so as to preserve ductility at cryogenic temperatures, since ferromagnetic materials become brittle at temperatures below the Curie transition temperature and cannot be used as load carrying structures.

The split clamp 58 is surrounded by, but is not in contact with a collar 62 of each end shaft. There is a collar 62 attached to both ends of the rotor core 22, although only one collar is shown in FIG. 3. The collar is a thick disk of nonmagnetic material, such as stainless steel, the same as or similar to the material, that forms the rotor shafts.

The collar has a slot 64 orthogonal to the rotor axis and sufficiently wide to receive and clear the split clamp 58. The hot side-walls 66 of the slot collar are spaced apart from the cold split clamp so they do not come in contact with each other.

Figure 4:
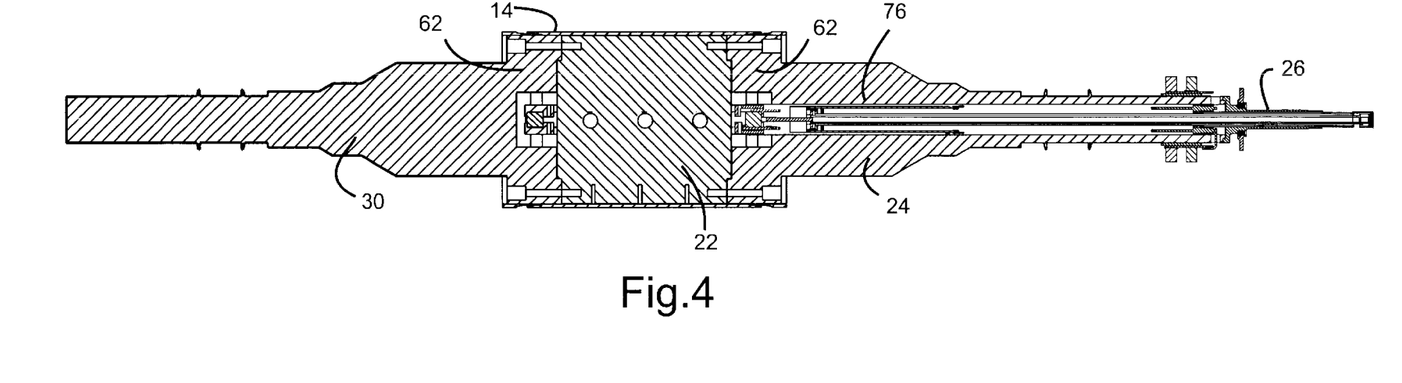
FIGS. 4 and 5 are cross-sectional diagrams of a rotor having a racetrack SC coil winding and end shafts.
Figure 5:
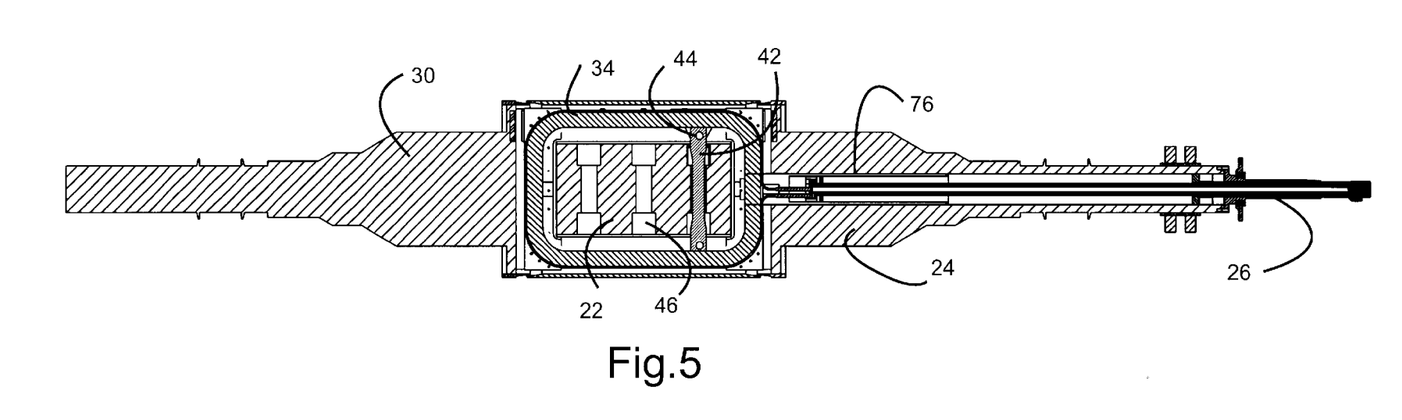
Figure 6:
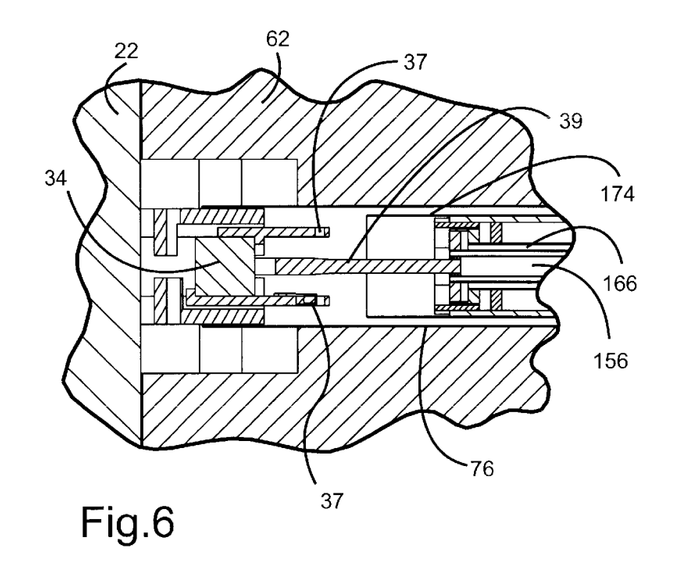
FIGS. 6, 7 and 8 show cross-sectional diagrams of the collector end shaft of the rotor.
Figure 7:
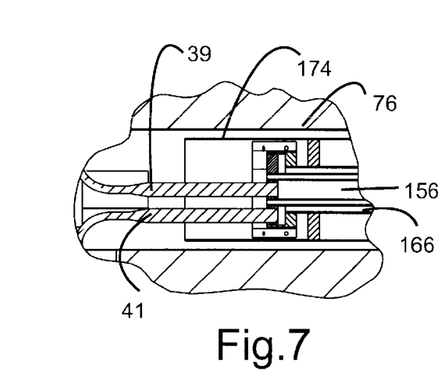
Figure 8:
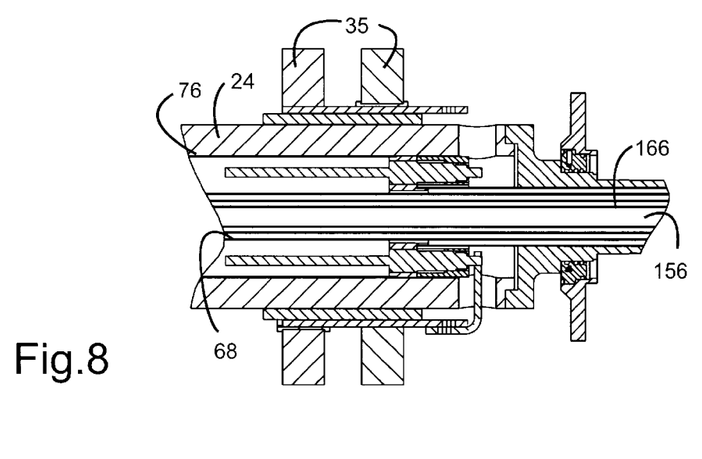

FIGS. 4 and 5 are cross-sectional diagrams of the rotor, where FIG. 5 shows in plan view the coil winding around the rotor core, and FIG. 4 shows a view orthogonal to FIG. 5. FIGS. 6, 7 and 8 are cross-sectional close-up diagrams of the collector end shaft 24. In particular, these figures show a conduit tube 76 extending through the collector end shaft 24 of the rotor. This conduit 76 provides a passageway for the cooling tubes and electrical contacts that connect to the SC winding. The conduit 76 extends through the end shaft 24 from the collar 62 show the conduit 76 near the rotor core 22 and the end shaft 24. FIG. 7 shows an enlarged view of the cooling inlet and outlet ports 39, 41 that connect to the coil winding 38. FIG. 8 shows an enlarged view of the collector end shaft 24 of the rotor.

The electrical connections 37 from the coil winding 34 are connected to electrical lines that extend the length of the end shaft 24 towards the collector ring 35. The electrical lines extend through the conduit 76 in the shaft and are supported inside a thin-walled tube 174.

The cooling inlet and outlet ports 39, 41 from the coil connect to the inlet and outlet cooling tubes 156, 166 that extend the length of the end shaft. The inlet tube 156 extends to an inlet port 39 that is coaxial with the rotor axis. The cooling gas outlet port 41 is offset from the rotor axis and couples through a gas transfer housing to an annular outlet tube 166. The outlet tube 166 is coaxial with the inlet tube and external to the inlet tube.

Figure 9:
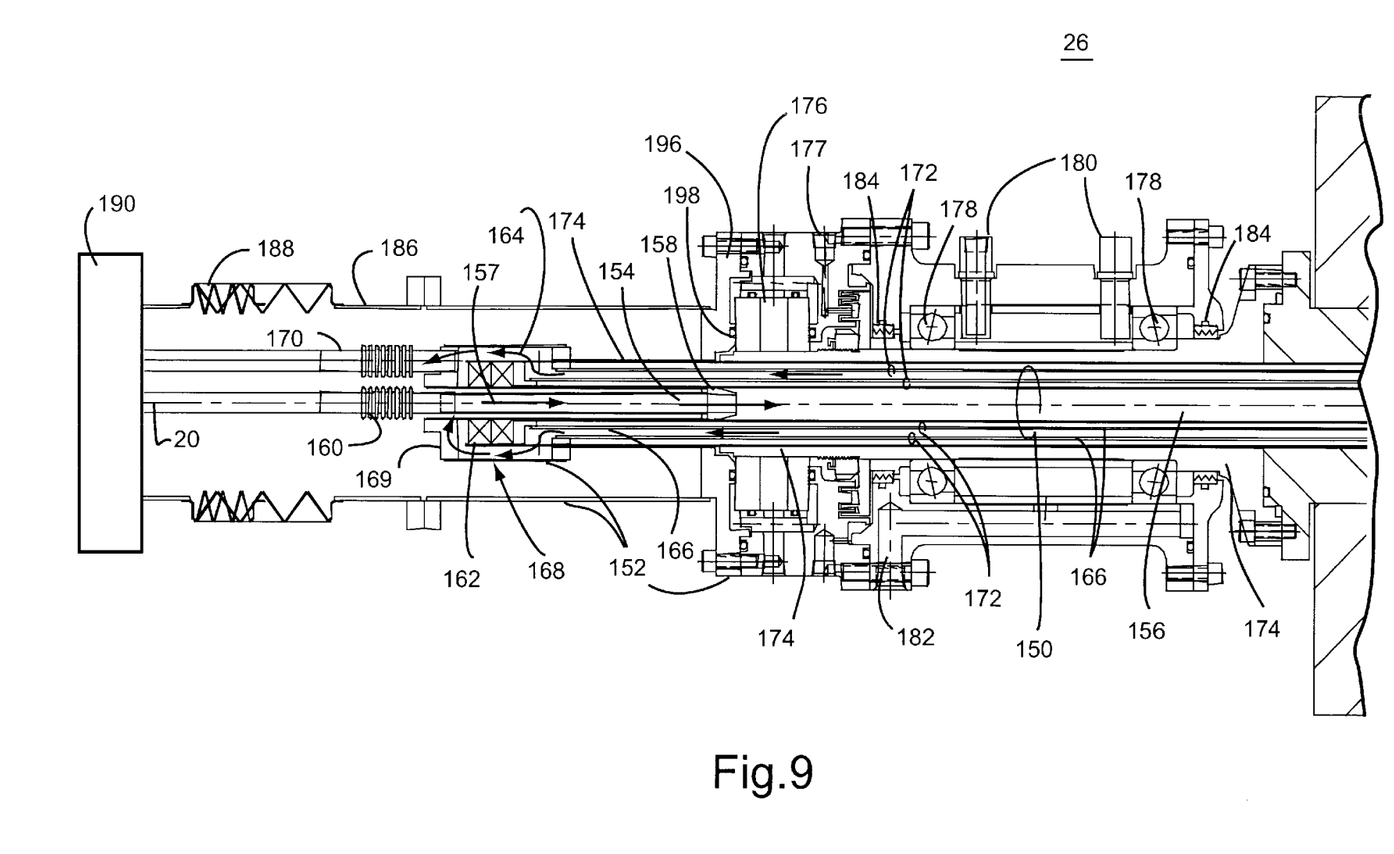
FIG. 9 is a schematic cross-sectional view of a cryogenic gas transfer coupling assembly.

FIG. 9 shows an exemplary transfer coupling 26 having rotating shaft components 150 and stationary components 152 that surround the shaft components. The transfer coupling connects the rotor end shaft 24 to a stationary source of cryogenic cooling fluid used to cool the SC coil windings in the rotor.

Cold cryogenic gas is transferred from a stationary cryorefrigrator 190 (shown schematically) through a stationary bayonet 154 to an inlet tube 156 rotating with the rotor shaft 24. Right facing arrows 157 show the inlet cooling gas passing through the coupling and flowing along the axis 20 of the rotor towards the HTS coils. The bayonet is coaxial with the rotor axis 20. The end 158 of the bayonet provides a non-contact seal with the inlet tube 156. The opposite end of the bayonet is connected to a flexible tube 160 connected to cryorefrigrator and provides a source of the inlet cooling Helium gas. A rotating relative motion gap seal 162 with a clearance seal about the bayonet limits leakage of the inlet cooling gas to the lower pressure return gas.

Hot cooling gas (shown by left facing arrows 164) flows in an annulus formed between the cooling inlet tube 156 and a cooling outlet tube 166, which is coaxial with the inlet tube. The hot cooling gas passes through the HTS coil windings and removes heat from those windings.

The hot cooling gas exits the rotating outlet tube 166 and passes between the gap seal 162 and a stationary cylindrical casing 168 surrounding the gap seal. An end disk 169 of the casing has an outlet port offset from the rotor axis that connects to the return flexible tube 170 for transferring hot cryogenic gas from the rotor to the cryorefrigerator 190. The hot cooling gas enters a flexible tube 170 that is connected to the cryorefrigerator. The flexible tube is offset from the axis 20 of the rotor.

All cryogenic gas transfer tubes 156, 166 are vacuum jacketed 172 to minimize heat transfer to the gas. The return gas stream 164 is thermally insulated from ambient temperature by a length of thin wall tube 174 with a small relative motion gap (between the thin wall tube 174 and the rotating vacuum jacketed tube 166) to minimize convection heat transfer. Further thermal insulation is provided by a vacuum applied to the gap between the thin wall tube 174 and cylindrical housing 186.

A magnetic fluid seal 176 at the end of the shaft 174 provides a non-contacting positive sealing of the pressurized gas system. Air flow 177 is provided from an external source to serve as a buffer that separates the oil of bearings 178 from the magnetic fluid of the magnetic seal, so that the bearing oil cannot contact the magnetic fluid.

The cryogenic gas transfer coupling 26 is supported on the rotor shaft by precision bearings 178 that limit the overhung tube vibration and run out in order to prevent rubbing of the seals and at the relative motion gaps. Oil jet nozzles 180 provide lubricant for the bearings. An oil drain 182 allows for removal of old and excess bearing oil. Labyrinth seals 184 prevent leakage of oil from the bearings.

A cylindrical housing 186 surrounds the bayonet end of the cooling transfer coupling 26 and the flexible tubes 160, 170. The housing is attached to a flexible cylindrical bellows 188 connected to the cryorefrigerator 190. A vacuum is maintained within the housing 186 to provide thermal insulation between ambient temperature and the flexible tubes and gas transfer coupling.

The magnetic fluid seal 176 is encased in a cylindrical housing 196 and is sealed with O-rings 198 with respect to the non-rotating components of the coupling 26 to prevent leakage of the return gas.

The rotating tubes 156, 166 are thermally insulated from each other by a vacuum jacket 172. The cooling gas inflow tube 156 is maintained separate from the gas outflow by a stationary motion gap seal 162 (as well as the double walls of the inflow gas tube 156 which are vacuum jacketed). Similarly, the double-walled outer rotating tube (cooling outlet tube 166) is vacuum jacketed 172 and is further housed in a thin wall stationary tube 174. These inlet and outlet tubes 156, 166 extend from the coupling to the inlet and outlet ports 39, 41 of the HTS coil winding.

To provide gas flow sealing between the rotating and stationary components of the coupling 26, non-contact clearance seals and magnetic fluid seals are used in conjunction with precision bearings and short overhang tubes with narrow relative motion gaps. These features of the gas transfer coupling 26 prevent frictional heating. Such frictional heating occurs in contact sealing systems due to rubbing or vibration. Other advantages of a non-contact sealing system are long coupling life, high reliability gas seals, and low thermal losses in the gas coupling.

In operation, the bayonet tube 154 of the transfer coupling 26 is coupled to a source of cryogen cooling fluid via flexible tube 160. Similarly, the outlet tube 166 and casing for gas seal 168 are coupled to the outlet flexible tube 170. The cryogenic seal housing 186 is connected to the cylindrical housing of the transfer coupling 26. Vacuums are established in the housing 186 and in the vacuum jackets 172 of the rotating tubes.

The cooling gas is usually an inert gas, such as helium, neon or hydrogen. Temperatures that are suitable for HTS super-conductors are generally below 30° K and preferably around 27° K. Cryogen fluid exits the cryorefrigerator at a temperature around 27° K. Cooling fluid (arrow 157) flows from the inlet flexible tube 160, through the bayonet tube 154 and inlet tube 156 to the rotor and HTS coil winding 34.

The cooled cryogenic fluid passes through the conduits in the rotor and into the cooling passages 38 of the HTS coil 36. The cooling gas removes heat from the HTS coil and maintains the coil at a sufficiently low temperature to achieve super-conducting characteristics of the coil. The cooling conduits have input and output ports 39, 41 at one end of the rotor core that connect to the cooling fluid coupling 26.

Heat transfer losses to the cryogenic gas are minimized to conserve refrigeration power and maintain the low operating temperatures needed for the SC coil. Heat losses are minimized by minimizing cooling fluid leakage and by minimizing heat transfer to the cryogenic cooling fluid.

A relative motion gap seal 162 is created with a clearance seal about the bayonet tube 154 that limits the leakage of the inlet cryogenic gas (arrow 157) to the lower pressure of the out-flowing return gas (arrow 164). Cooling fluid leakage has the effect of transferring unwanted thermal energy into the cooling system. Thus, cooling fluid leakage is reduced to increase the thermal insulation and total cooling efficiency of the cryogenic cooling system 26.

In addition to cooling fluid leakage, a second source of thermal inefficiency is conduction of heat from the surrounding components in the rotor. Adequate thermal insulation is provided between the cryogenic cooling gas and the surrounding ambient temperature components to minimize heat transfer to the cryogenic gas. For example, the cryogenic gas transfer tubes 156, 166 are vacuum jacketed 172 to ensure high thermal insulation.

Moreover, the return gas stream (arrows 164) is thermally insulated from ambient temperature by thin wall tubes 174 and vacuum jacketed tube 166 with a small relative motion gap (between the stationary tube 174 and rotating vacuum jacketed tube 166) to minimize convection heat transfer. These thermal standoff lengths, e.g., vacuum jacketed gaps between tubes, of relative motion gaps reduce the heat transfer to the cryogenic fluid and improve the capacity of the cryorefrigerator (by reducing thermal losses). Long thermal standoff lengths can result in long overhung tubing that vibrates excessively and may come into rubbing contact.

The cryogenic gas transfer coupling 26 support system is designed to reduce problems associated with tube vibration. The coupling 26 is supported on the rotor shaft by precision bearings 178 that limit overhung tube vibration and run out.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. A cooling fluid coupling between a rotor for a synchronous machine and a source of cryogenic cooling fluid comprising:

a rotating inlet cooling tube and a rotating outlet cooling tube in the rotor and coaxial with an axis of the rotor;

said inlet cooling tube having an input coupled to receive inlet cooling fluid from the source of cryogenic cooling fluid;

said outlet cooling tube having an output coupled to return cooling fluid from the rotor to source, where the output is at an axial end to the outlet cooling tube and the output is axially offset from the inlet cooling tube, and a stationary motion gap seal separating the input and output.

2. A cooling fluid coupling as in claim 1 further comprising a magnetic fluid seal.

3. A cooling fluid coupling as in claim 1 further comprising a vacuum jacket between the inlet cooling tube and the outlet cooling tube.

4. A cooling fluid coupling as in claim 1 further comprising a bayonet tube extending into the inlet cooling tube and said bayonet tube connected to the source of cryogenic cooling fluid.

5. A cooling fluid coupling as in claim 1 wherein the cryogenic cooling fluid is helium gas.

6. A cooling fluid coupling between a rotor for a synchronous machine and a source of cryogenic cooling fluid comprising:

a rotating inlet cooling tube and a rotating outlet cooling tube in the rotor and coaxial with an axis of the rotor;

said inlet cooling tube having an input coupled to receive inlet cooling fluid from the source of cryogenic cooling fluid;

said outlet cooling tube having an output coupled to return cooling fluid from the rotor to source, and a stationary motion gap seal separating the input and output, said first flexible tube offset from an axis of the rotor coupled to outlet cooling tube and a second flexible tube adjacent to the first tube and connected to the inlet cooling tube, wherein the second flexible tube is coaxial with the rotor axis.

7. A cooling fluid coupling as in claim 1 further comprising a stationary tube surrounding and coaxial with the outlet cooling tube.

8. A cooling fluid coupling as in claim 7 further comprising vacuum jacket between the outlet cooling tube and the stationary tube.

9. A cooling fluid coupling as in claim 7 further comprising a bearing supporting the stationary tube.

10. A cooling fluid coupling as in claim 7 further comprising a bearing supporting the stationary tube; a magnetic field seal supporting the outlet cooling tube in the stationary tube, and a rotating motion gap seal supporting the inlet cooling tube in the outlet cooling tube.

11. A cooling fluid coupling between a rotor for a synchronous machine and a source of cryogenic cooling fluid comprising:

a rotating inlet cooling tube and a rotating outlet cooling tube in the rotor and coaxial with an axis of the rotor;

said inlet cooling tube coupled to receive inlet cooling fluid from the source of cryogenic cooling fluid;

said outlet cooling tube coupled to return cooling fluid from the rotor to source, and a stationary motion gap seal supporting the inlet cooling tube in the outlet cooling tube.

12. A cooling fluid coupling between a rotor for a synchronous machine and a source of cryogenic cooling fluid comprising:

a rotating inlet cooling tube and a rotating outlet cooling tube in the rotor and coaxial with an axis of the rotor;

said inlet cooling tube coupled to receive inlet cooling fluid from the source of cryogenic cooling fluid;

said outlet cooling tube coupled to return cooling fluid from the rotor to source, wherein said outlet cooling tube is axially offset from the inlet cooling tube;

a rotating non-contact stationary motion gap seal supporting the inlet cooling tube in the outlet cooling tube;

a third tube encircling the outlet cooling tube and said third tube supported by a bearing, and a magnetic fluid seal supporting the outlet cooling tube in the stationary tube.

13. A cooling fluid coupling as in claim 12 further comprising a vacuum jacket between the inlet cooling tube and the outlet cooling tube.

14. A cooling fluid coupling as in claim 12 further comprising a bayonet tube extending into the inlet cooling tube, and said bayonet tube connected to the source of cryogenic cooling fluid.

15. A cooling fluid coupling as in claim 12 wherein the cryogenic cooling fluid is helium gas.

16. A cooling fluid coupling between a rotor for a synchronous machine and a source of cryogenic cooling fluid comprising:

a rotating inlet cooling tube and a rotating outlet cooling tube in the rotor and coaxial with an axis of the rotor;

said inlet cooling tube coupled to receive inlet cooling fluid from the source of cryogenic cooling fluid;

said outlet cooling tube coupled to return cooling fluid from the rotor to source;

a rotating non-contact stationary motion gap seal supporting the inlet cooling tube in the outlet cooling tube;

a third tube encircling the outlet cooling tube and said third tube supported by a bearing;

a magnetic fluid seal supporting the outlet cooling tube in the stationary tube, and a flexible tube offset from an axis of the rotor coupled to outlet cooling tube and a second flexible tube adjacent to the first tube and connected to the inlet cooling tube, wherein the second flexible tube is coaxial with the rotor axis.

17. A cooling fluid coupling as in claim 12 further comprising a vacuum jacket between the third tube and the outlet cooling tube.

18. A cooling fluid coupling as in claim 12 wherein the third tube is stationary.

* * * * *